(12) United States Patent
Bowyer

(10) Patent No.: US 10,440,968 B2
(45) Date of Patent: Oct. 15, 2019

(54) BARBECUE GRILL SMOKER

(71) Applicant: Stephen Bowyer, Franklin, MI (US)

(72) Inventor: Stephen Bowyer, Franklin, MI (US)

(*) Notice: Subject to any disclaimer, the term of this patent is extended or adjusted under 35 U.S.C. 154(b) by 460 days.

(21) Appl. No.: 14/325,725

(22) Filed: Jul. 8, 2014

(65) Prior Publication Data
US 2016/0007622 A1 Jan. 14, 2016

(51) Int. Cl.
A23B 4/052 (2006.01)
A47J 37/07 (2006.01)

(52) U.S. Cl.
CPC ........... *A23B 4/052* (2013.01); *A47J 37/0704* (2013.01); *A47J 37/0786* (2013.01)

(58) Field of Classification Search
CPC ..... A23B 4/052; A23B 4/0523; A23B 4/0526; A47J 37/0704; A47J 37/0786; A47J 37/0718; A47J 37/0731
USPC ................... 99/482, 467; 126/540, 541–542
See application file for complete search history.

(56) References Cited

U.S. PATENT DOCUMENTS

| 1,587,350 | A | | 6/1926 | Parke | |
|---|---|---|---|---|---|
| 1,948,724 | A | * | 2/1934 | Laun | A47B 3/12 108/156 |
| 2,597,477 | A | | 5/1952 | Haislip | |
| 3,611,910 | A | * | 10/1971 | Hughes | A23L 1/1815 206/45.2 |
| 4,471,985 | A | | 9/1984 | Mahoney | |
| 4,482,181 | A | | 11/1984 | Shepherd | |
| 4,569,327 | A | * | 2/1986 | Velten | A47J 37/0763 126/25 A |
| 4,801,166 | A | | 1/1989 | Jordan | |
| 5,048,882 | A | | 9/1991 | Fielding | |
| 5,293,859 | A | * | 3/1994 | Lisker | A47J 37/0768 126/25 A |
| 5,490,452 | A | | 2/1996 | Schlosser | |
| 5,729,854 | A | | 3/1998 | Powers | |
| 5,755,151 | A | * | 5/1998 | Nowicke, Sr. | A47J 37/0704 126/25 R |
| 6,000,739 | A | | 12/1999 | Zemit | |
| 6,260,896 | B1 | | 7/2001 | Dozier | |
| 6,467,474 | B2 | | 10/2002 | Hermansen | |
| 6,523,463 | B1 | | 2/2003 | Hogle | |

(Continued)

OTHER PUBLICATIONS

Oscarware Park Style Backyard Grill http://oscarwareinc.com/prod_41.htm.

(Continued)

*Primary Examiner* — Michael G Hoang
(74) *Attorney, Agent, or Firm* — Carlson, Gaskey & Olds, P.C.

(57) ABSTRACT

A barbecue grill smoker assembly includes a firebox base and fuel grate handles and food grate handles connected to components internal to a cooking chamber of the grill smoker that extend outwardly beyond the cooking chamber. The grill smoker assembly includes a fuel grate assembly in the form of a basket that, when combined with a food grate assembly, contains solid fuel within an area defined by a compartment. Fuel can be managed by manipulating the food grate assembly and the fuel grate assembly. The fuel grate assembly may include an aperture to facilitate transfer of residual solid fuel to a charcoal starting device. The lid features a lid support to support the lid when inverted.

20 Claims, 7 Drawing Sheets

(56) References Cited

U.S. PATENT DOCUMENTS

| | | | |
|---|---|---|---|
| 6,845,705 B1* | 1/2005 | Chen | A47J 37/0704 126/25 R |
| 8,677,891 B2 | 3/2014 | Stier | |
| 2002/0134369 A1* | 9/2002 | Hermansen | A47J 37/0763 126/25 R |
| 2004/0149144 A1* | 8/2004 | Qubeka | A47J 37/0704 99/450 |
| 2006/0042475 A1 | 3/2006 | Craig | |
| 2008/0230045 A1* | 9/2008 | Bruno | A47J 37/0704 126/25 R |

OTHER PUBLICATIONS

Marsh Allen 30052 AMZ Hibachi Grill http://www.amazon.com/Marsh-Allen-30052AMZ-PRODUCTS-CHARCOAL/dp/B00DIORROOS.

* cited by examiner

BARBECUE GRILL SMOKER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

This invention relates to a new barbecue grill smoker which improves the ease of use mostly for solid fuel grill smokers, such as charcoal or wood, but also for gas and electric grill smokers. Specifically, the barbecue incorporates handles that attach to the various components inside the cooking apparatus, a basket to support and sift the fuel after use, and legs located on the lid to support the lid in an inverted position.

Discussion of Prior Art

Cooking outdoors on a barbecue grill smoker is a popular activity supporting a healthy and flavorful eating experience. This method of food preparation is particularly flavorful when a solid fuel such as charcoal or wood is used. However, the use of solid fuelled grills is dirty due to the additional soot and ash created and costly due to the inability to reclaim the remaining fuel for later use once the cooking has been completed.

During the preparation and cooking process, there are several reasons that the food cooking grate needs to be removed from the grill smoker. Sometimes the grill smoker is cold, such as when the grill smoker is being prepared to be lit, but there are also times when the grate needs to be removed in the middle of the cooking process in order to retrieve food which has fallen below the cooking surface or, if solid fuel is being used, additional fuel needs to be added or rearranged. When using a modern grill assembly, these activities will burn your hands when the grill smoker is hot while a cold grill smoker leaves your hands covered in soot. Further, modern grill smoker assemblies do not provide a place to store the grate while you continue to work on the grill without transferring soot to where you are storing the grate or burn the storage surface when the grill is hot.

There have been several attempts to facilitate easy removal of the food cooking grate in the past in order to satisfy one or both of these tasks. Grill smokers currently on the market commonly have wire handles protruding upward from the cooking surface as illustrated in U.S. Pat. No. 5,490,452 to Schlosser et al. (1996). These handles are still within the grilling space and are subjected to the same heat, food and other cooking bi-products as the cooking surface. As a result, the handles are too hot to use during grill smoker operation and, when the grill smoker is cold, the handles are still covered in soot and food residue and cannot be used without transferring this debris to the user's hands or gloves.

Several patents have been issued for removable grill handles used to lift and manipulate the grilling or cooking surface. For example, U.S. Pat. No. 1,587,350 to Parke (1926), U.S. Pat. No. 2,597,477 to Haislip (1948), U.S. Pat. No. 4,471,985 to Mahoney (1984), U.S. Pat. No. 4,482,181 to Shepherd (1984), U.S. Pat. No. 4,801,166 to Jordan et al. (1989), U.S. Pat. No. 5,048,882 to Fielding et al. (1991), U.S. Pat. No. 5,729,854 to Powers (1998), and U.S. Pat. No. 6,000,739 to Zemit et al. (1999) have attempted to solve these problems using removable grill handles.

While these devices allow for lifting the grilling surface in either hot or cold conditions and also solve the problem associated with soiled handles, they do have distinct disadvantages. One major disadvantage is that the handle assemblies are not firmly attached to the grilling surface and, therefore, have limited control. While this may be acceptable when the grill smoker is empty and cold, it is higher risk when the grill smoker is hot and possibly loaded with food which adds significant weight in a cantilevered condition. They also rely on the stiffness of the cross rails within the center of the grill smoker where they are unsupported by the stiffer sections at the perimeter of the cooking surface leading to further instability. Insufficient stability when manipulating the hot cooking surface can lead to burns and dropping the food being cooked.

In addition, such removable devices can be easily lost, misplaced when needed, or left behind when traveling. To reduce the possibility of losing or forgetting the tool, many would likely store the tools inside the grill smoker which would then soil the handles of the tool.

Finally, these tools are designed for a specific construction for the cooking surfaces that they are intended to lift. For example, most of the tools can be used to lift a wire grate but cannot lift a cooking surface made from expanded metal due to the smaller openings.

Handles are frequently attached to the grilling surface in hibachi style and permanently mounted barbecue grill smokers found at many parks and recreation areas. These handles are used to adjust the height of the cooking surface relative to the heat source. The implementation of this design would not be feasible for an enclosed barbecue grill smoker. The large openings at the sides of the grill smoker would not allow for metering the air flow to and from the fuel as is common with consumer grade grill smokers. The inability to control the air flow leads to limited control of the heat during the cooking process and to fuel waste since the air flow cannot be stopped when cooking has completed.

To date, there have been no documented attempts to utilize handles, removable or attached, for the lower grates of the cooking apparatus that would enable removal of the fuel grate. Under current practices, clearing the ash in many cooking devices or reclaiming salvageable but previously used solid fuel requires removal of the fuel and/or the lower grate by hand so that the ash from the previous use can be removed. The user's hands become soiled in the process making the use of solid fueled grill smokers unpleasing to many. A handle connection to the fuel supporting grate was disclosed in U.S. Pat. No. 8,677,891 B2 to Stier (2014). However, the fuel supporting grate and handle are intended only to rotate the fuel supporting grate and enable a vertical fuel rack. In addition, the fuel grate and handles are assembled to the grill smoker in a way such that removal of the fuel supporting grate is not possible for cleaning of the grill or spreading the fuel after ignition.

During the cleaning, fueling, and lighting process for the grill smoker, the lid as well as various internal components must be removed and temporarily stored. Many grill smokers on the market today feature a hook to hang the lid on the base or a hinged lid. This satisfies the storage requirement for the lid, but no documented attempts have been found to provide storage for the cooking or fuel grates. The current state of the art requires that one or more of these grates must be stored outside of the grill during the cleaning, fueling or lighting process. As such, the ash and debris on these components will transfer onto where they are stored. Further, if the grill is already hot and additional fuel is required, there is no location to safely store the hot cooking grate.

Salvaging the previously used solid fuel remaining in the cooking device can save the user a significant amount of operating costs over the lifetime of the grill smoker. However, current practices discussed above prevent, or at least discourage, many users from salvaging previously used solid fuel. Furthermore, there is currently no easy way to transfer the salvaged fuel from the cooking apparatus to a charcoal starting device such as the one described in U.S. Pat. No. 3,167,040 to Byers (1965).

To address this, the salvageable solid fuel needs to be conveniently contained for easy removal and sifted to remove residual ash from previous uses. Most grills on the market have a simple lower grate used to support the fuel. When this is lifted to sift the residual ash from the previous use or the ash emptied from the firebox the solid fuel frequently falls off of the grate because the fuel is not contained at the edges of the grate. These fuel pieces must then be manually placed back on the grate soiling the hands or tools of the user.

Fuel grates with vertical walls have been used in some grill smokers such as those disclosed in U.S. Pat. No. 6,467,474 B2 to Hermansen et al. (2002), U.S. Pat. No. 8,677,891 B2 to Stier (2014) and US 2006/0042475 by Craig (2006). However, the baskets in these disclosures are intended to keep the exterior of the grill cool or perform radiant heat cooking and do not facilitate salvaging residual fuel from prior uses because they fail to fully encompass the fuel for the shaking and sifting process. Other fuel grates with vertical walls forming a maze have been used such as the ones disclosed in U.S. Pat. No. 6,523,463 to Hogle (2003). However, fuel grates such as these are used to control the burn rate of the charcoal and not for containment of the residual fuel.

Drum smokers frequently use a basket to contain solid fuel. These baskets are intended to simplify loading the drum with fuel and maintaining an air space underneath the fuel. While the sidewalls can be sufficiently tall to facilitate the sifting process, this basket cannot be used to facilitate salvaging fuel because the air volume in such a device is large enough that fuel is fully consumed during the cooking process even though the airflow may be closed off. Should the volume be smaller in such a device, the sidewalls could not be as high which would then not allow for the sifting process. In addition, the handles attached to such a basket are maintained within the cooking chamber making them hot and develop grime coating on them. This soils the user's hands and having the handles in a heated environment prevent handling of the basket during operation.

The solid fuel within the grill smoker must be arranged differently for the lighting process relative to the cooking process. For example, solid fuel must be piled together in order to facilitate the lighting process when using a liquid lighting agent. The fuel must be maintained in the pile in order to speed bringing the cooking apparatus up to desired temperature. Once the grill smoker is up to temperature, the fuel should be spread out in order to create a wider, even heating cooking surface. Currently, piling the fuel in order to start the grill smoker is a dirty process performed mostly by hand while the only way to spread the solid fuel once it has been lit is to utilize a tool that fits between the rails of the cooking surface and push the solid fuel to the desired location. A spatula or tongs are frequently used to accomplish this task but they are then soiled and will transfer ash to the cooked food. Another approach is to use a specialized tool such as the one described in U.S. Pat. No. 6,260,896 to Dozier (2001). However, this device is only compatible cooking surfaces constructed from straight wire. It is also complicated to use as the tool needs to be inserted within the spacing of the cooking grate and then rotated normal to the installation direction before it can be used. Furthermore, an additional device must be purchased and stored.

3. Objects & Advantages

Accordingly, several objects and advantages of my invention are:
   (a) a way to lift a cooking surface to add fuel to a solid fuel grill smoker without requiring a tool burning or soiling the user's hands;
   (b) a way to lift a cooking surface to facilitate starting a grill smoker without requiring a tool burning or soiling the user's hands;
   (c) a way to lift a cooking surface to retrieve food which has fallen below the cooking surface without requiring a tool burning or soiling the user's hands;
   (d) a way to rearrange the solid fuel without requiring a tool or burning or soiling the user's hands;
   (e) a way to lift the fuel supporting surface in order to assist in cleaning the grill smoker without requiring a tool burning or soiling the user's hands;
   (f) a way to transfer fuel to an ignition device without soiling the user's hands;
   (g) a way to lift the fuel supporting surface in order to sift or separate previously used solid fuel from the ash developed during the previous use without requiring a tool burning or soiling the user's hands;
   (h) a way to support the cooking surface;
   (i) increased the longevity of the grill smoker device by minimizing the contact of the fuel source with the outer bottom pan;
   (j) a way to provide a cool handling or supporting location for the cooking surface or fuel supporting surface;
   (k) a way to support the lid using the clean, outer surface while lighting or cooking on the grill smoker;
   (l) a support for the lid during grill smoker cleaning;
   (m) a way to store the cooking grate while adding fuel to the grill smoker;
   (n) a way to store the cooking grate while preparing the grill for use; and
   (o) a way to store the fuel and food grates during cleaning of the grill smoker.

Still further objects and advantages for the attachment of cool and clean handles for the various cooking grates within an outdoor cooking device, supporting the fuel on a grate with sides for fuel containment during sifting, and support legs installed on the top of the lid will become apparent from a consideration of the ensuing description and drawings.

SUMMARY

According to the present invention, several improvements were made to the traditional barbecue grill smoker. The first improvement comprises handles which attach to the cooking or fuel grates within a barbecue grill smoker that extend outside of the cooking enclosure. The handles can be used to more easily start the grill smoker, add fuel to the heat source at the start or during cooking, manage the location and distribution of the heat source, and cleaning of the grill smoker assembly.

The second improvement comprises a basket that, when combined with the cooking grate provides an encompassing basket for containing solid fuel to facilitate sifting of residual ash from the solid fuel used during a prior cooking event. This allows for the containment of the fuel separately from the firebox or bottom housing of the barbecue. This enables easier cleaning of the grill smoker, salvaging of the used fuel from prior use and easier location and distribution of the fuel. The basket, when equipped with an aperture in one or more sides, can also be used to transfer the salvaged fuel into a starting device such as a charcoal chimney.

The third improvement comprises of legs added to the top of the grill smoker's lid. The legs support the lid of the grill smoker when inverted. This enables the user to store the lid off of the grill smoker during use without soiling the table with the grime typically lining the inside of the grill smoker. In addition, the inverted lid can be used to store the solid fuel grate or basket and the food grate in the lid while the grill smoker is being prepared for use. This includes emptying ash from the firebox or base of the grill smoker as well as adding more fuel to the grill smoker.

DRAWINGS—LIST OF REFERENCE NUMERALS

10—barbecue grill smoker assembly
11—firebox base
12—lid
13—side handle
14—lid support
15—lid handle
20—food grate assembly
21—food grate handles
22—food grate
30—fuel grate assembly
31—fuel grate handles
32—fuel grate

BRIEF DESCRIPTION OF THE DRAWINGS

A better understanding of the present invention will be developed upon reference of the accompanying drawings in which the numerals refer to like parts throughout the several views and wherein.

DETAILED DESCRIPTION OF PREFERRED EMBODIMENT

Although the present invention can be made in many different forms, one preferred embodiment is described in this disclosure and shown in the attached drawings. This disclosure exemplifies the principles of the present invention and does not limit the broad aspects of the invention only to the illustrated embodiment. The following description is not to be taken in a limiting sense, but is made merely for the purpose of illustrating the general principles of the invention, since the scope of the invention is best defined by the appended claims.

Figure 1:
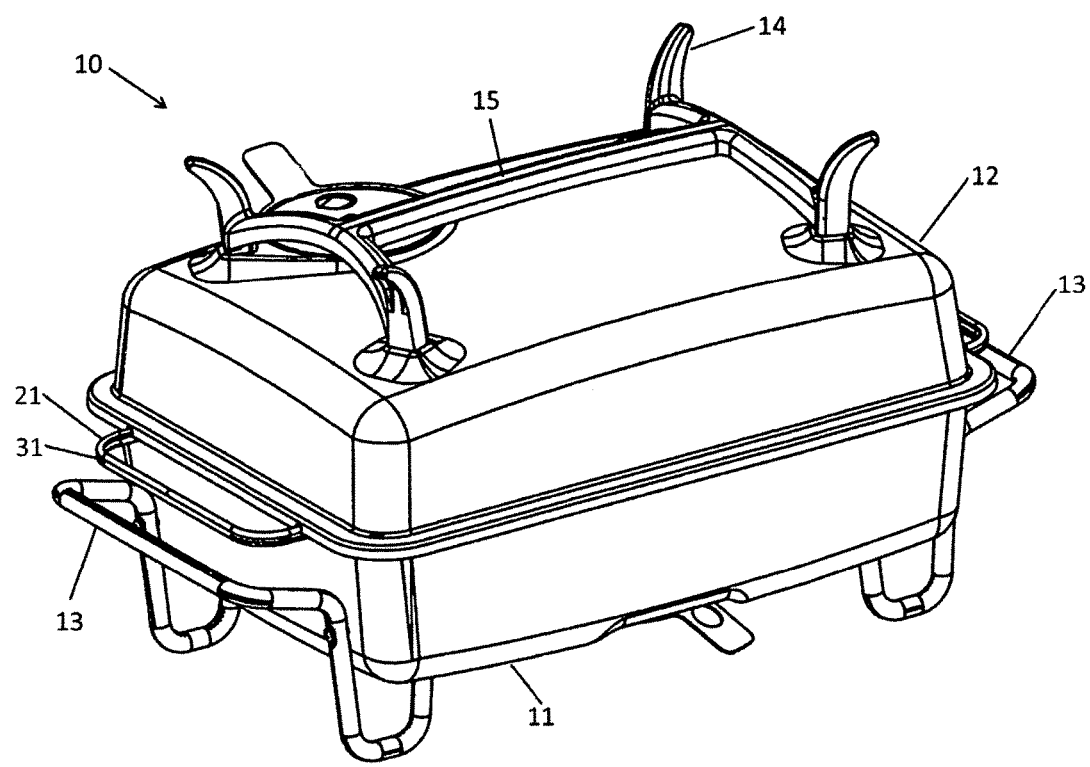
FIG. 1 is a pictorial representation of the barbecue grill smoker assembly constructed according to the present invention with external handles connecting to internal components, and vertical supports attached to the lid assembly.

FIG. 1 is a perspective view of the preferred embodiment of a grill smoker assembly 10 made in accordance with the principles of the present invention. This view illustrates the extension of food grate handles 21 and fuel grate handles 31 attached to internal components extending outward from the cooking chamber defined by a firebox base 11 and a lid 12. Food grate handles 21 and cooking grate handles 31 shown in this embodiment are made from metal wire but could be made from cast metal, heat resistant plastic, or other suitable material. Firebox base 11 and lid 12 could be constructed from sheet steel or aluminum, cast aluminum, steel or iron, cast ceramic or other manufacturing process or material. Also visible in this figure are lid supports 14 which are illustrated as integrated into a lid handle 15 in this embodiment. Lid supports 14 could be integrated into the lid, separate pieces, or integrated into other grill smoker assembly components.

Figure 2:
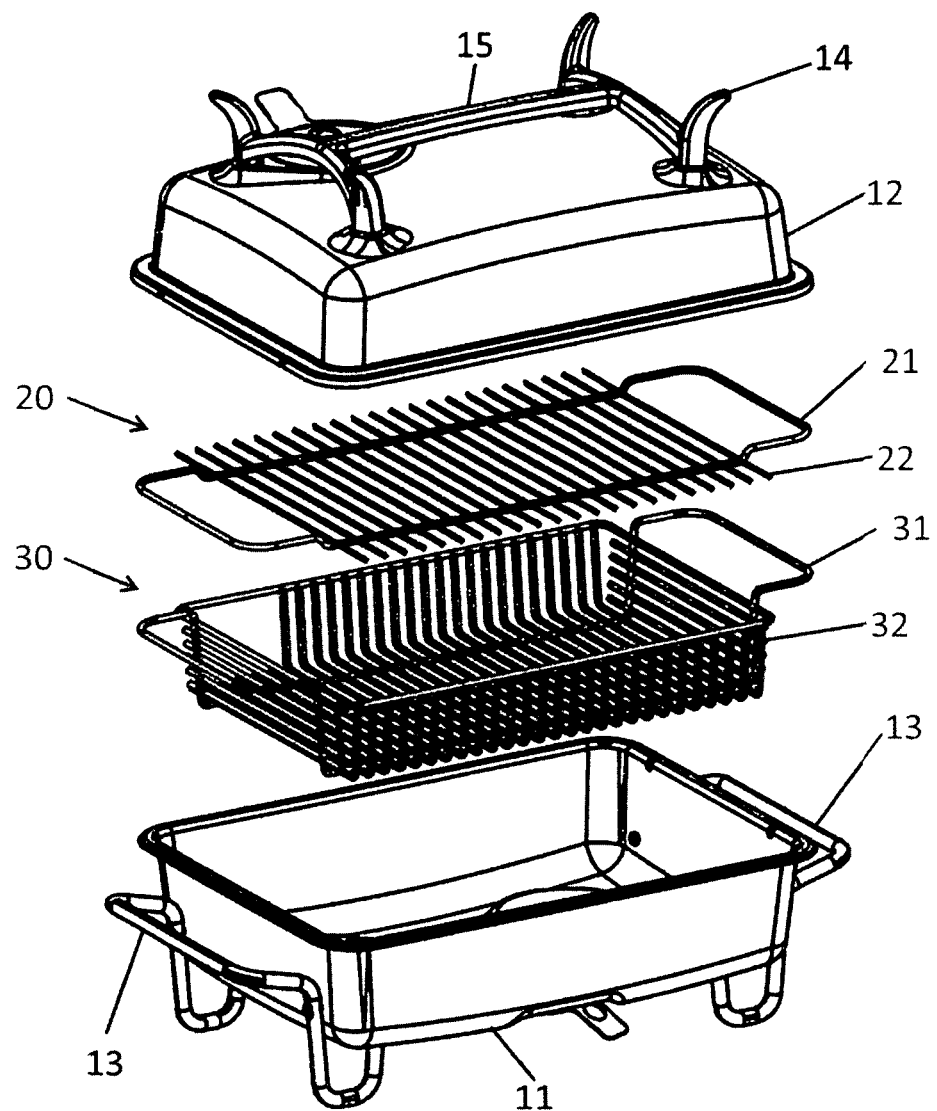
FIG. 2 is an exploded view showing the internal components within the grill assembly. This view illustrates one possible embodiment of the food grate and solid fuel basket raised to show the connection of the handles and assembly of the key components.
Figure 3:
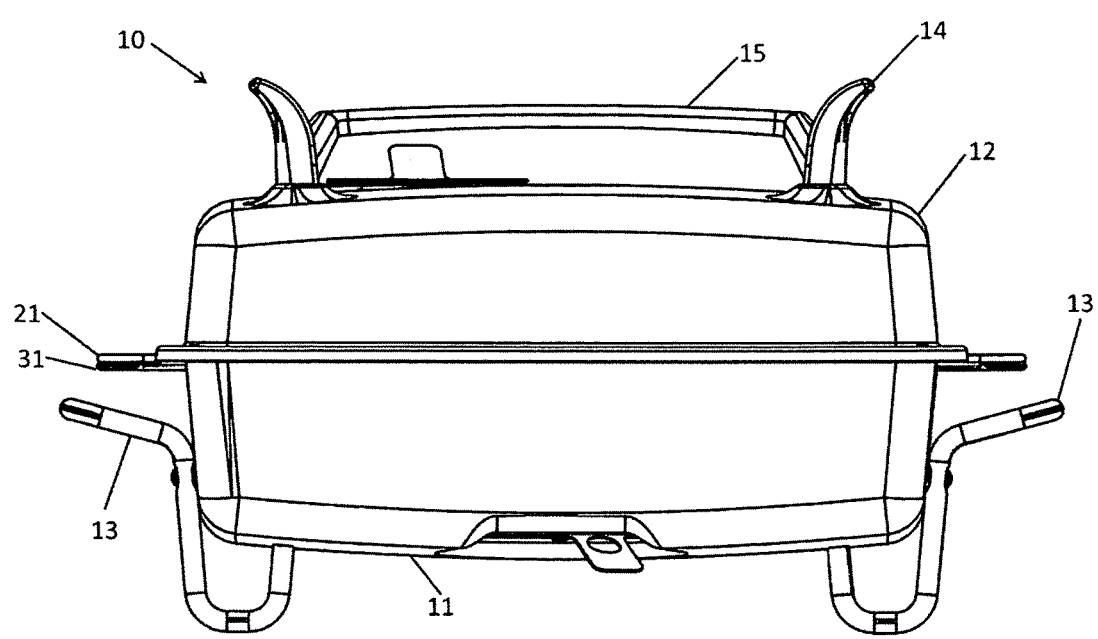
FIG. 3 is a front view of the barbecue grill smoker assembly to show the projection of the handles for the food grate and solid fuel basket beyond the area defined by the cooking space.

FIG. 2 is an exploded view of the preferred embodiment. A food grate assembly 20 comprises a food grate 22 used to support food above the fuel or heat source and the food grate handles 21 which extend beyond the cooking chamber defined by firebox base 11 and lid 12. A fuel grate assembly 30 comprises of a fuel grate 32 used to support a solid fuel within the grill smoker and fuel grate handles 31 which extend beyond firebox 11 and lid 12 and are separate from side handles 13 and lid handle 15. The food grate handles 21 and fuel grate handles 31 shown in the illustrated embodiment are integrated as part of the food grate 22 and fuel grate 32. Alternative embodiments are also possible with welded, screwed, or otherwise fastened to fuel grate 32 and food grate 22.

Food grate assembly 20 is removable from grill smoker assembly 10 and can be rectangular, square, round or other shape and can be constructed from metal wire, expanded sheet metal, cast metal, or with another manufacturing process. Food grate assembly 20 has a cooking side which is shown facing up in FIG. 2 and a bottom side which faces the cooking heat which is shown facing downward in FIG. 2. Food grate assembly 20 supports food items during cooking and can be supported by the edges of food grate assembly 20, food grate handles 21, or by other means. Food grate handles 21 are comprised of metal wire, heat resistant plastic, or other heat resistant materials which can be welded, brazed, screwed, molded or otherwise attached to food grate 22 and extend beyond the cooking area of the grill smoker defined by firebox base 11 and lid 12 at its boundaries.

Figure 4:
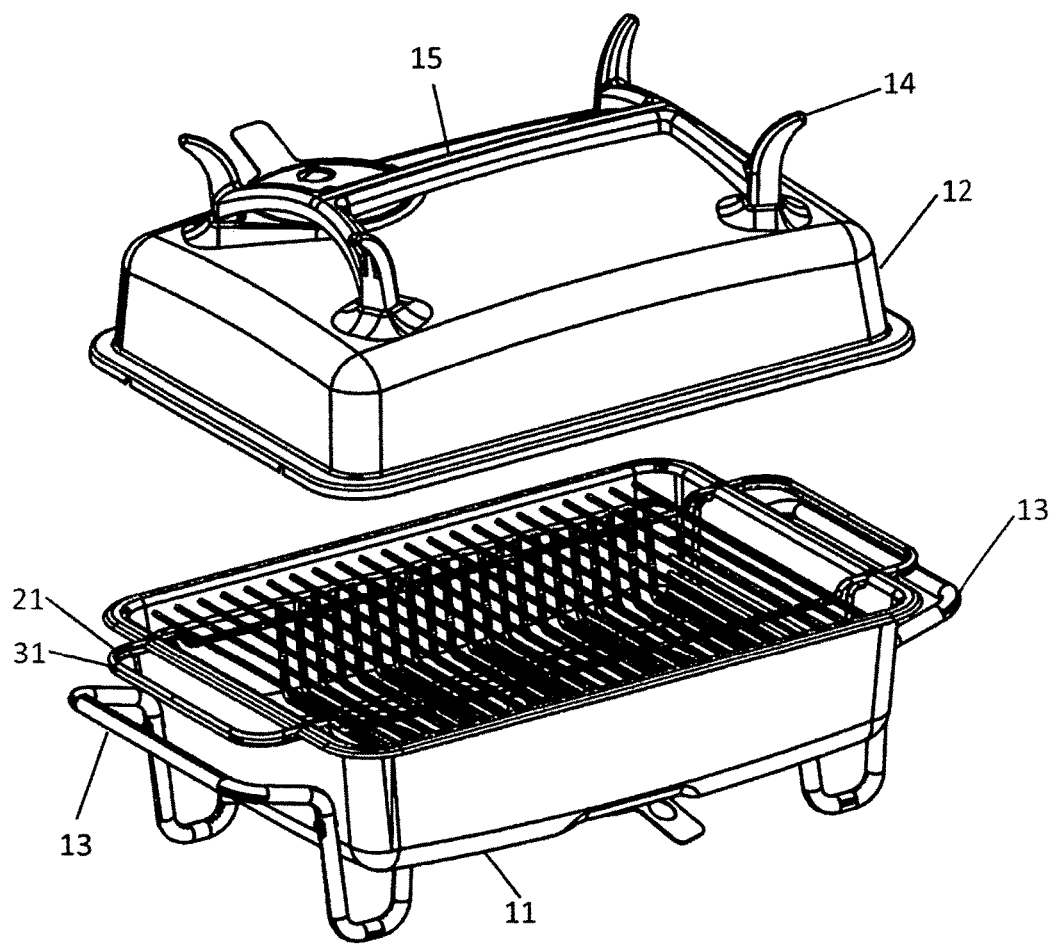
FIG. 4 is a view similar to FIG. 1 with the lid moved up to show the connection of the handles to the internal food grate and solid fuel basket.

Fuel grate assembly 30 is removable from grill smoker assembly 10 and can be rectangular, square, round or other shape and can be constructed from metal wire, expanded sheet metal, cast metal, or with another manufacturing process. Fuel grate assembly 30 supports the solid fuel within grill smoker assembly 10 and comprises multiple sides attached to the base forming a basket for the fuel. Fuel grate assembly 30 in its preferred embodiment is shown in FIG. 4. The four sides of fuel grate assembly 30 extend up near to food grate assembly 20 to fully encompass the fuel without support from firebox base 11. Fuel grate assembly 30 can be supported by fuel grate handles 31 as in the preferred embodiment or alternatively at firebox base 11, or at the edges of fuel grate assembly 30. Fuel grate handles 31 are comprised of metal wire or other heat resistant materials which can be welded to or otherwise attached to fuel grate 32 and extend beyond the cooking area of the grill smoker defined by firebox base 11 and lid 12 at its boundaries. When the basket of the fuel grate assembly 30 is combined with the food grate assembly 20, an encompassing basket for containing solid fuel is formed.

Figure 5:
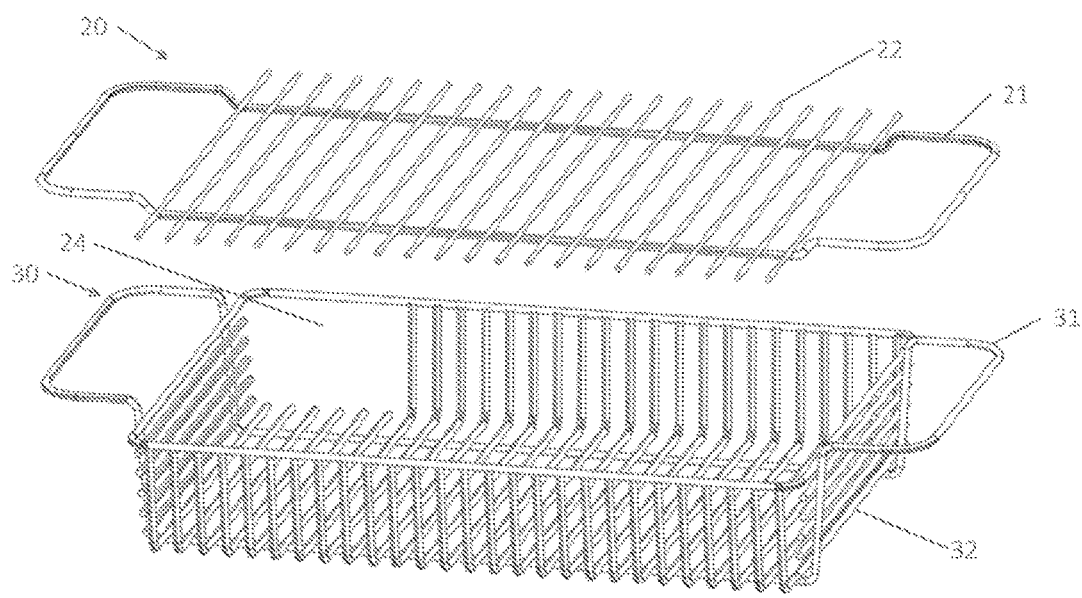
FIG. 5 is a close-up view of the food and fuel grates as shown in FIG. 2. This view also shows one potential embodiment of the aperture in the fuel basket as identified in the present invention.

Fuel grate assembly 30 in its preferred embodiment has an aperture 24 or void in one or multiple sidewalls as shown in FIG. 5 which can be used in combination with food grate 22 as a funnel for transferring salvaged fuel to an ignition device.

Figure 6:
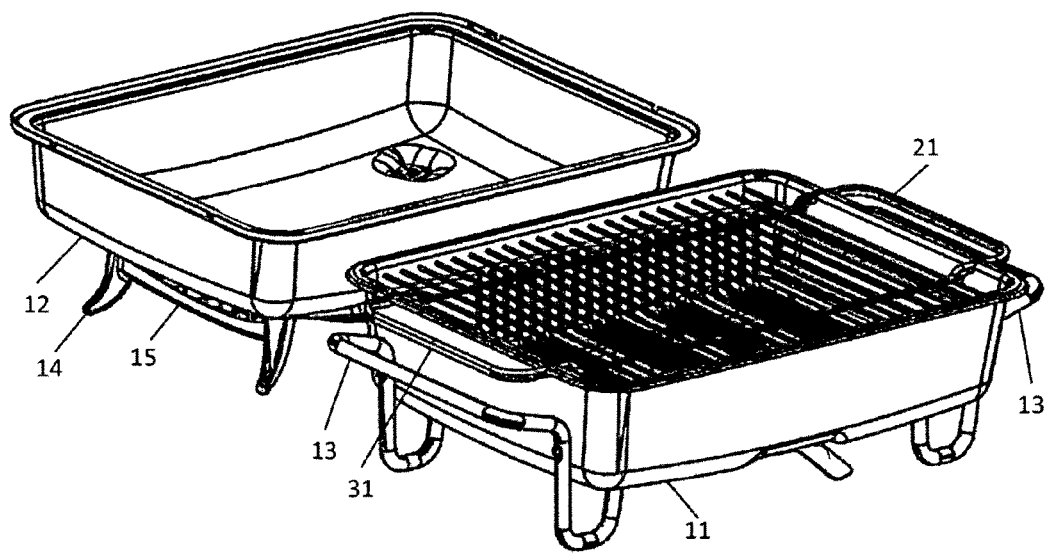
FIG. 6 shows the grill smoker assembly with the lid in an inverted position and resting on a flat surface. This is a representation of the condition that would be consistent when cooking on the grill smoker with the lid off, adding food to the grill smoker, or removing cooked food from the grill smoker.
Figure 7:
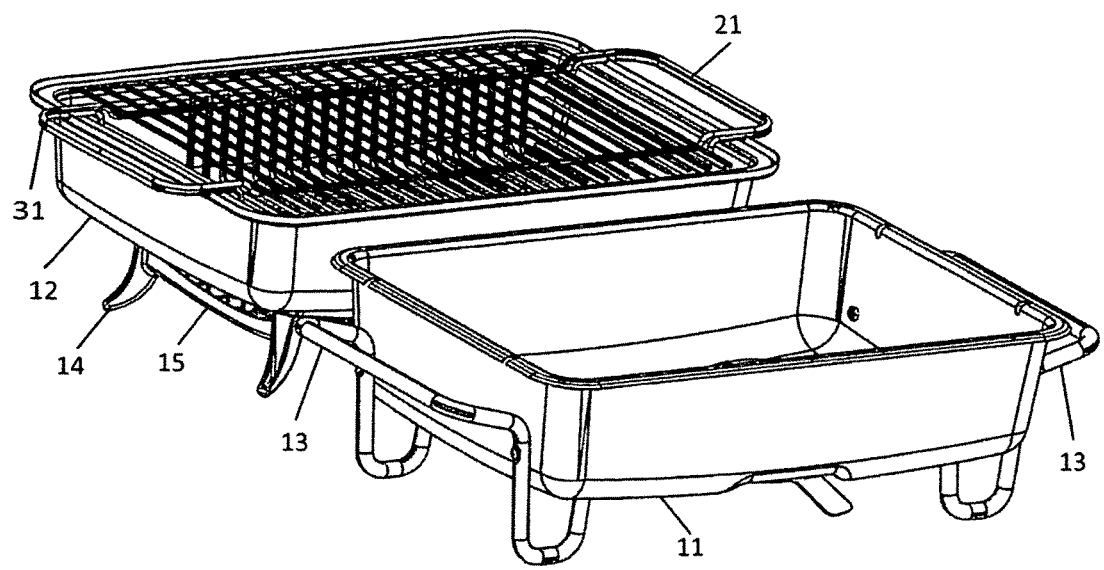
FIG. 7 shows the lid in an inverted position with the food grate and fuel basket resting on the lid. This is a representation of the condition that would be consistent when cleaning the grill smoker or adding fuel to the basket.

When lid 12 is moved to uncover food grate 22 of grill smoker assembly 10, lid 12 can be inverted and stand on one or more lid supports 14 as shown in FIG. 6. Lid supports 14 can be integrated into lid handle 15 as illustrated in the preferred embodiment shown in FIGS. 1-4 and FIGS. 6-7, integrated into lid 12, or comprise separate components. The ability to set lid 12 in an inverted position allows the user to store lid 12 with the clean side touching the surface storing the lid. In addition, once set in an inverted position, as shown in FIG. 6, lid 12 may be used as a temporary storage of food grate assembly 20 and fuel grate assembly 30 while barbecue smoker firebox base 11 is being cleaned or prepared for use as shown in FIG. 7.

I claim:

1. A barbecue grill smoker assembly comprising:
   a firebox base including an interior compartment defined by a firebox bottom surface and firebox wall surfaces surrounding said firebox bottom surface;
   a food grate assembly including a food grate and food grate handles extending outside said firebox base and flush with an upper rim of the firebox base, wherein said food grate assembly is removable from said firebox base; and
   a fuel grate assembly including a fuel grate basket and fuel grate handles extending outside said firebox base, wherein side walls of said fuel grate assembly extend up towards said food grate assembly, wherein said fuel grate assembly is removable from said firebox base, and wherein said food grate assembly and said fuel grate basket directly contact and together define an encompassing basket that contains solid fuel.

2. The barbecue grill smoker assembly as recited in claim 1 wherein both said food grate and said fuel grate basket are located inside said interior compartment of said firebox base.

3. The barbecue grill smoker assembly as recited in claim 1 wherein said food grate assembly is seated on said fuel grate assembly.

4. The barbecue grill smoker assembly as recited in claim 1 wherein said fuel grate basket includes a fuel grate bottom surface and said fuel grate assembly side walls.

5. The barbecue grill smoker assembly as recited in claim 1 wherein said food grate defines a planar food grate surface and said fuel grate basket includes a bottom planar fuel grate surface and fuel grate wall surfaces that together define said encompassing basket.

6. The barbeque grill smoker assembly as recited in claim 5 wherein at least one of said fuel grate wall surfaces includes an aperture sized to allow solid fuel to be removed by funneling said solid fuel from said fuel grate basket.

7. The barbecue grill smoker assembly as recited in claim 1 wherein said fuel grate assembly is non-rotatable when seated in the interior compartment.

8. The barbecue grill smoker assembly as recited in claim 1 including a lid assembly including a lid top surface and lid wall surfaces surrounding said lid top surface that define a lid compartment, and said lid assembly includes a lid support that supports said lid assembly when inverted, and said food grate assembly and said fuel grate assembly can be contained in said lid compartment.

9. The barbecue grill smoker assembly as recited in claim 8 wherein said food grate handles exit the cooking chamber at an interface between said firebox base and said lid assembly.

10. The barbeque grill smoker assembly as recited in claim 1, wherein the fuel grate handles are situated between the food grate handles and firebox base handles situated on an exterior of the firebox base.

11. A barbecue grill smoker assembly comprising:
    a firebox base including an interior compartment defined by a firebox bottom surface and firebox wall surfaces surrounding said firebox bottom surface;
    a lid including a lid top surface and lid wall surfaces surrounding said lid top surface that define an interior compartment, wherein said lid and said firebox base directly contact and define a cooking chamber; and
    a food grate assembly including a food grate and food grate handles located outside said firebox base, wherein said food grate assembly is removable from said firebox base, and said food grate handles exit the cooking chamber and are flush with an upper surface of the firebox base upon which the lid is seated.

12. The barbecue grill smoker assembly as recited in claim 11 including a fuel grate assembly including a fuel grate basket, wherein said food grate and said fuel grate basket together define an encompassing basket that contains solid fuel, and said fuel grate assembly and said food grate directly contact each other.

13. The barbecue grill smoker assembly as recited in claim 12 wherein said fuel grate assembly is non-rotatable when seated in the interior compartment.

14. The barbeque grill smoker assembly as recited in claim 12 wherein at least one side wall of said fuel grate assembly includes an aperture sized to allow solid fuel to be removed by funneling said solid fuel from said fuel grate assembly.

15. A barbecue grill smoker assembly comprising:
    a firebox base including an interior compartment defined by a firebox bottom surface and firebox wall surfaces surrounding said firebox bottom surface;
    an encompassing basket defined by a food grate assembly and a fuel grate assembly, wherein said food grate assembly includes a planar food grate, and said fuel grate assembly includes a fuel grate bottom surface and fuel grate side walls, wherein said fuel grate side walls extend up towards said food grate assembly, and said food grate assembly and said fuel grate assembly directly contact and together form said encompassing basket within said firebox base; and a lid including an interior defined by a lid top surface and lid wall surfaces surrounding said lid top surface to define a lid compartment, wherein said lid includes lid supports to support said lid when inverted, and said encompassing basket is receivable in said lid compartment.

16. The barbecue grill smoker assembly as recited in claim 15 wherein said lid comprises a handle assembly, and the lid supports and a lid handle are included in said handle assembly.

17. The barbeque grill smoker assembly as recited in claim 16 wherein the lid supports include a first set of lid supports that are connected by a first beam and a second set of lid supports that are connected by a second beam, and said lid handle extends between said first beam and said second beam.

18. The barbecue grill smoker assembly as recited in claim 15 wherein said lid comprises a handle assembly that extends from a center of said lid to a periphery of said lid, and said handle assembly comprises one of the lid supports and a lid handle.

19. The barbecue grill smoker assembly as recited in claim 15 wherein said lid comprises a lid handle assembly having a center handle that extends from a center of said lid to a periphery of each side of said lid, and said lid handle assembly includes handles normal to said center handle at the periphery of said lid.

20. The barbecue grill smoker assembly as recited in claim 15 wherein said lid comprises a lid handle assembly having a center handle extending from a center of said lid to a periphery of said lid, and said lid handle assembly includes handles normal to said center handle, and said handle assembly includes one of the lid supports.

* * * * *